(No Model.)
C. W. BALDWIN.
LUBRICATOR.
No. 287,085. Patented Oct. 23, 1883.
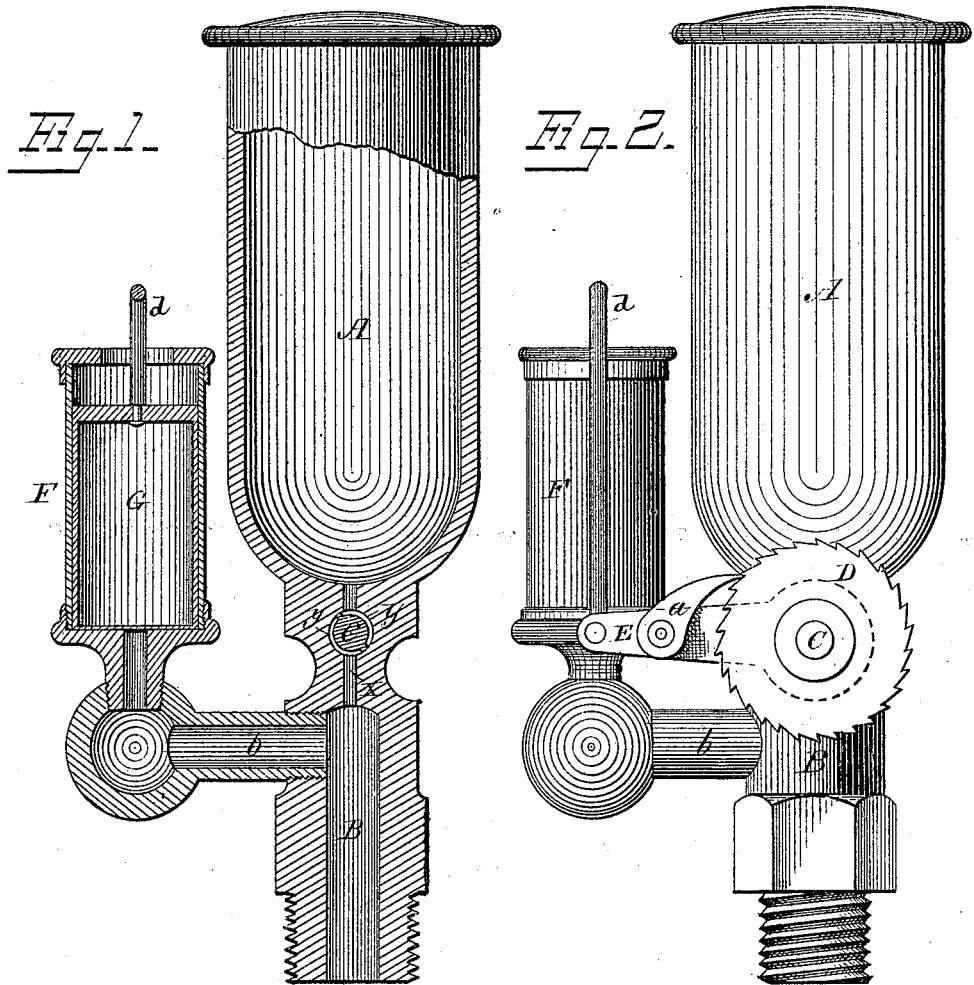
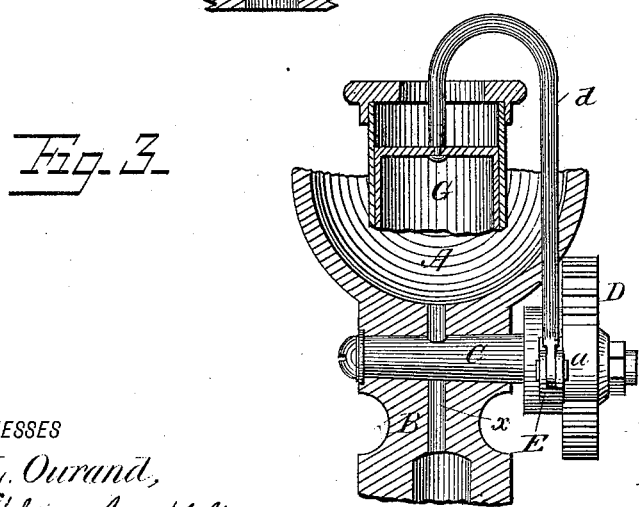
WITNESSES
F. L. Ourand,
Josephine Campbell.
INVENTOR
Cyrus W. Baldwin
by Foster & Freeman
Attorneys

UNITED STATES PATENT OFFICE.

CYRUS W. BALDWIN, OF CHICAGO, ILLINOIS.

LUBRICATOR.

SPECIFICATION forming part of Letters Patent No. 287,085, dated October 23, 1883.

Application filed August 11, 1883. (No model.)

*To all whom it may concern:*

Be it known that I, CYRUS W. BALDWIN, a citizen of the United States, residing in the city of Chicago, county of Cook, and State of Illinois, have invented certain new and useful Improvements in Lubricators, of which the following is a specification.

My invention is a lubricator especially adapted for motor-engines, and constructed, as fully described hereinafter, so as to feed the lubricant with a rapidity proportionate to that of a series of pulsations actuating a plunger, piston, or diaphragm.

In the drawings, Figure 1 is a sectional elevation, showing one form in which my lubricator is made. Fig. 2 is an outside view. Fig. 3 is a transverse section.

The device consists, essentially, of a cylinder or case containing a plunger or diaphragm, a reservoir for oil or other lubricating material, and a valve or equivalent device for controlling the flow of the oil from the reservoir. The cylinder or case is in communication at one end with a channel or chamber in which air or other fluid has a varying pressure, whereby the plunger or diaphragm is caused to reciprocate, and the said plunger or diaphragm is connected to the valve to operate the same.

In the construction shown in the drawings, the oil box or reservoir A is mounted on a hollow stem, B, terminating in a threaded nipple, so that it can be screwed into an opening in the cylinder of an engine. In the stem B is the seat of a valve, C, (shown as a rotary plug-valve with one or more channels,) and carrying at the end a ratchet-wheel, D, with the teeth of which engages a pawl, *a*, carried by an arm, E, hung to the stem of the valve. With the channel in the stem B communicates a hollow arm, *b*, carrying the case or cylinder F, in which is a plunger, G, connected by a rod, *d*, with the outer end of the arm E, so that the reciprocation of the plunger will cause the wheel D and its valve to be turned with a step-by-step motion, alternately letting on and cutting off the flow of oil from the reservoir.

The varying pressure below the plunger may be caused by any suitable means. For instance, all the arms *b* of a series of oil-feeders may communicate with a pipe into which air is forced artificially to produce impulses which throw up the plungers, the latter descending on the cessation of pressure. The construction shown is especially adapted for gas-engines, where the varying pressure in the engine-cylinder causes the plunger to rise and fall automatically, so that the rapidity with which the oil is fed depends upon the rapidity of the motion of the main piston.

Where the passage *x*, through which the oil is discharged, communicates with the passage receiving the varying motor-pressure, the valve C should be so constructed that the pressure is not transmitted to the reservoir. Thus there may be one or more pockets, *y*, each of which, by the rotation of the valve, is first put into communication with the reservoir and filled, and then with the passage *x* and emptied.

A reciprocating plunger-valve may replace the plug-valve C, and any suitable connections may be made between the plunger or its equivalent and the valve.

Without therefore limiting myself to the precise construction of parts shown, I claim—

1. A feeding device for lubricators, consisting of a reservoir, a valve, and a cylinder having a plunger or diaphragm connected to the the valve, and arranged to be reciprocated by varying fluid-pressure to operate the valve, substantially as set forth.

2. An oil-feeder consisting of a reservoir, valve, cylinder, plunger or diaphragm connected to the valve, and passages whereby the varying pressure within an engine is made the means of directly operating the plunger, substantially as specified.

3. The combination of an oil-reservoir, a valve controlling the flow of oil therefrom, a case or cylinder, a plunger or diaphragm within the latter, and direct mechanical connections between the plunger and valve, substantially as described.

4. The combination of the oil-reservoir, valve carrying a ratchet-wheel, and vibrating arm attached to the valve-stem and carrying a pawl, and case containing a plunger connected to said arm, substantially as described.

In testimony whereof I have signed my name to this specification in the presence of two subscribing witnesses.

CYRUS W. BALDWIN.

Witnesses:
JAMES P. SANDERS,
WALTER REYNOLDS.